Sept. 23, 1958     K. A. KLINGLER     2,852,947
TWO WAY VALVE ACTUATING MECHANISM
Filed June 28, 1956     2 Sheets-Sheet 1

Inventor
Karl A. Klingler by Parker & Carter
Attorneys

Sept. 23, 1958    K. A. KLINGLER    2,852,947
TWO WAY VALVE ACTUATING MECHANISM
Filed June 28, 1956    2 Sheets-Sheet 2
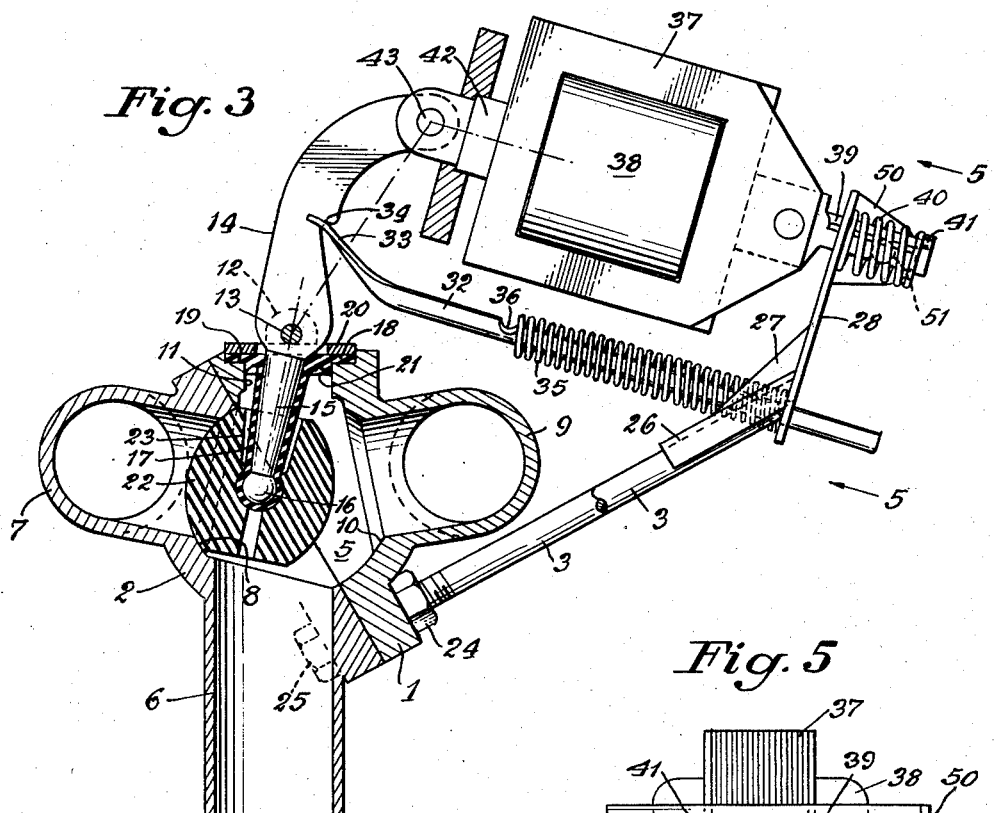
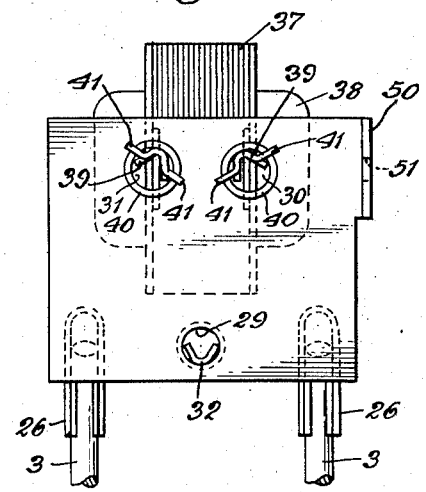
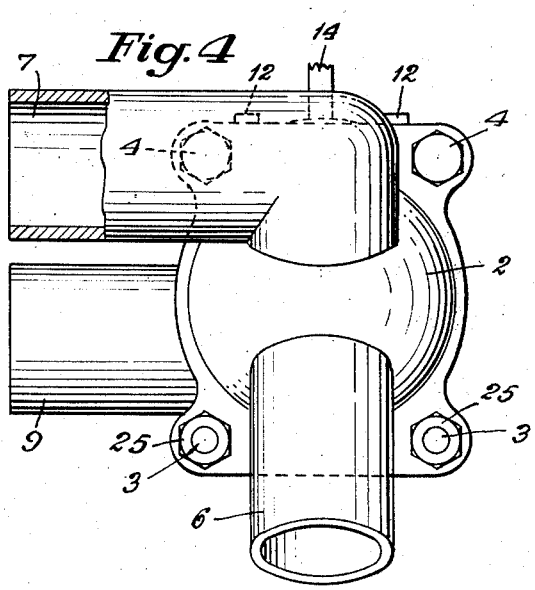
Inventor
Karl A. Klingler
by Parker & Carter
Attorneys 2,852,947

TWO WAY VALVE ACTUATING MECHANISM

Karl A. Klingler, Naperville, Ill.

Application June 28, 1956, Serial No. 594,646

7 Claims. (Cl. 74—99)

My invention relates to a new and useful improvement of valve actuating mechanism and has for one object to provide a suitable light, inexpensive and reliable valve opening and closing mechanism.

Another object of my invention is to provide a solenoid actuated valve opening and closing mechanism wherein a solenoid of minimum strength may be used.

Another object of my invention is to provide in a solenoid valve operated mechanism means whereby the solenoid excursion may be the maximum necessary for solenoid operation even though excursion is greater than the necessary excursion of the valve itself.

I have illustrated my invention in connection with a two-way valve though it could equally well be used in connection with other types of valve.

The valve will be solenoid actuated. A solenoid works in one direction only. A two-way valve has two positions. A spring seats it in one position, the solenoid overcomes the spring and applies enough additional pressure to unseat the valve from the first position and seat it in the second position. The solenoid must be able to complete its full excursion. A yielding connection permits the solenoid after the valve is seated to continue its travel to the end.

I have illustrated my invention as applied to a ball valve though obviously other valves might be used.

Under some circumstances, it is conceivable that other actuating means, hydraulic or air cylinder might take the place of the solenoid. Also the particular operating mechanism might be applied to other than a two-way valve and I wish, therefore, that my disclosure be regarded as generally illustrative of an actuating mechanism of the kind where the possible excursion of the motor element is greater than the possible excursion of the element being moved whereby when excursion of the element being moved has been completed, the support for the mechanism permits even further movement of the power element.

My invention is illustrated more or less diagrammatically in the accompanying drawings, wherein—

Figure 3 is a section similar to Figure 2 showing the parts in the position assumed when the motive element has completed its actuating excursion;

Figure 4 is a side elevation of the valve housing as shown in Figure 1;

Figure 5 is a view taken in the direction of the arrows 5 showing end elevation of Figure 1.

Like parts are indicated by like characters throughout the specification and drawings.

Figure 1:
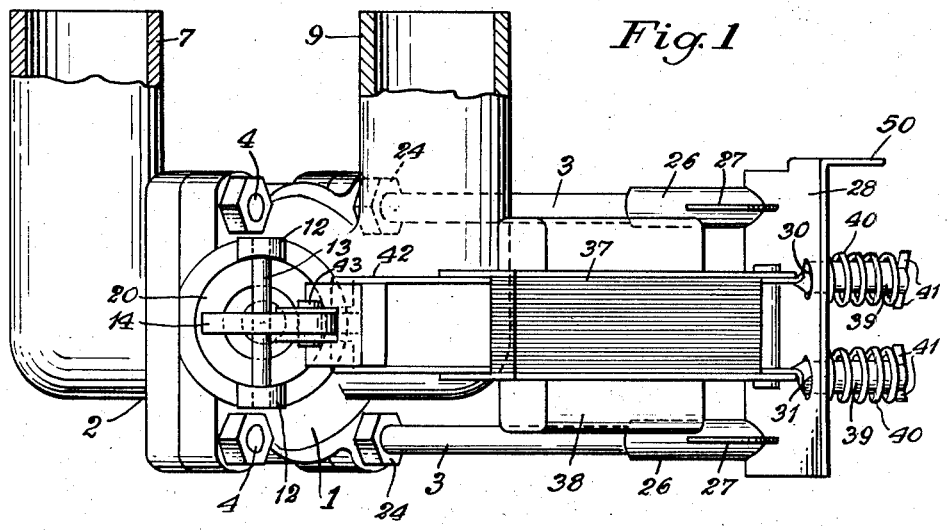
Figure 1 is a plan view of the valve housing and actuating mechanism.

1, 2 are two sections of a valve housing held together by studs 3 and bolts 4. The two sections define a valve chamber 5. Inlet tube 6 integral with the housing section 2 defines the usual inlet port communicating with the valve chamber 5. An exhaust tube 7 integral with housing section 2 defines an exhaust port encircled by an exhaust valve seat 8. An exhaust tube 9 integral with the housing section 1 defines an exhaust port encircled by an exhaust valve seat 10. The tubes 7 and 9 are side by side and generally parallel and in this case generally at right angles to the intake tube 6 but they and the exhaust ports defined by them are so disposed that the axis of the port in each case makes an obtuse angle with the axis of the intake sleeve.

The housing 1 is apertured as at 11. On each side of the aperture are outwardly extending lugs 12 drilled out to furnish bearings for the pivot pin 13 on which is pivotally mounted a valve actuating lever 14 terminating at its inner end in a valve supporting finger 15 having an enlarged head 16 and enclosed by a rubber or elastomeric sleeve or sack 17 closed at its inner end, extending outwardly toward the pivot 13, flanged at 18 to rest against the annular sealing surface 19 concentric with the aperture 11. A washer 20 rests upon the flange 18 and is of such thickness that when the pin 13 is in place, it engages the upper face of the washer 20, compresses it against the flange 18 and holds the flange seated on the sealing surface 19. A thin flexible fin 21 extends downwardly from the flange 18 to rest against the wall of the housing so that hydraulic pressure forces the fin 21 against the housing and makes a tight seal.

Enclosing the inward end of the finger 15 is a ball valve 22 penetrated by the enlarged head 16 and thereby held in place on the finger. The valve is recessed as at 23 so that while the head 16 snugly engages the ball valve, the valve is free to rock on the finger 15 to adjust itself in position for proper contact with the valve seats 8 or 10 respectively, as the lever 14 is angularly displaced.

It will be noted that when either one of the valve seats is engaged by the ball valve, the angle of flow from the intake through the valve chamber and out through the open port is such that a minimum resistance to flow by eddy currents is interposed because of the fact that the axes of the cylinder 6 and the ports 8 and 10 as above pointed out are inclined to one another on obtuse angles.

The sole purpose of the bolts 4 is to hold the two halves of the valve housing together. The studs 3 have a dual purpose. Each of the studs is threaded at its lower end. A nut 24 is threaded thereon and welded in place and serves as an abutment so that when the nut 25 is tightened up, the two halves of the housing are drawn together. Each stud 3 at its outer end is welded to a semi-circular trough-like member 26 which is flanged and reinforced at 27 to support an abutment plate 28, which plate is apertured at 29, 30 and 31.

32 is a lever actuating push rod of generally U-shaped cross section as indicated in Figure 5 and flattened at 33 and notched to engage the notch 34 in the lever 14. The push rod 32 is free to reciprocate with respect to the plate 28, passing through the aperture 29. The compression spring 35 encircling the push rod 32 abuts on fingers 36 bent outwardly from the opposite sides of the channeled rod 32 at one end and at the other end on the plate 28 so that the spring 35 biases the valve lever and finger in a counterclockwise direction to maintain the ball valve 22 normally seated on the exhaust valve seat 10.

The solenoid coil yokes 37 support a solenoid coil 38 and carry channelled guide members 39 which penetrate respectively the apertures 30 and 31 in the plate 28. Springs 40 encircle the members 39 abutting at one end on the plate 28 and at the other end on fingers 41 bent outwardly from the channeled shaped members 39 so as to bias the solenoid toward the plate 28.

42 is a solenoid plunger associated with the solenoid and pivoted at 43 on the lever 14 so that when the solenoid is energized, the plunger 42 may be drawn to the right compressing the spring 35 and causing the ball 22 to seat upon the valve seat 8 leaving the valve seat 10.

This takes place without any change in the position of the solenoid yokes because it takes more power to compress the springs 40 than it does to compress the spring 35. However, as soon as the ball 22 is seated on the seat 8 which occurs before the end of the solenoid excursion, the power exerted by the solenoid then compresses the springs 40 to permit the solenoid plunger to make its complete excursion.

Figure 2:
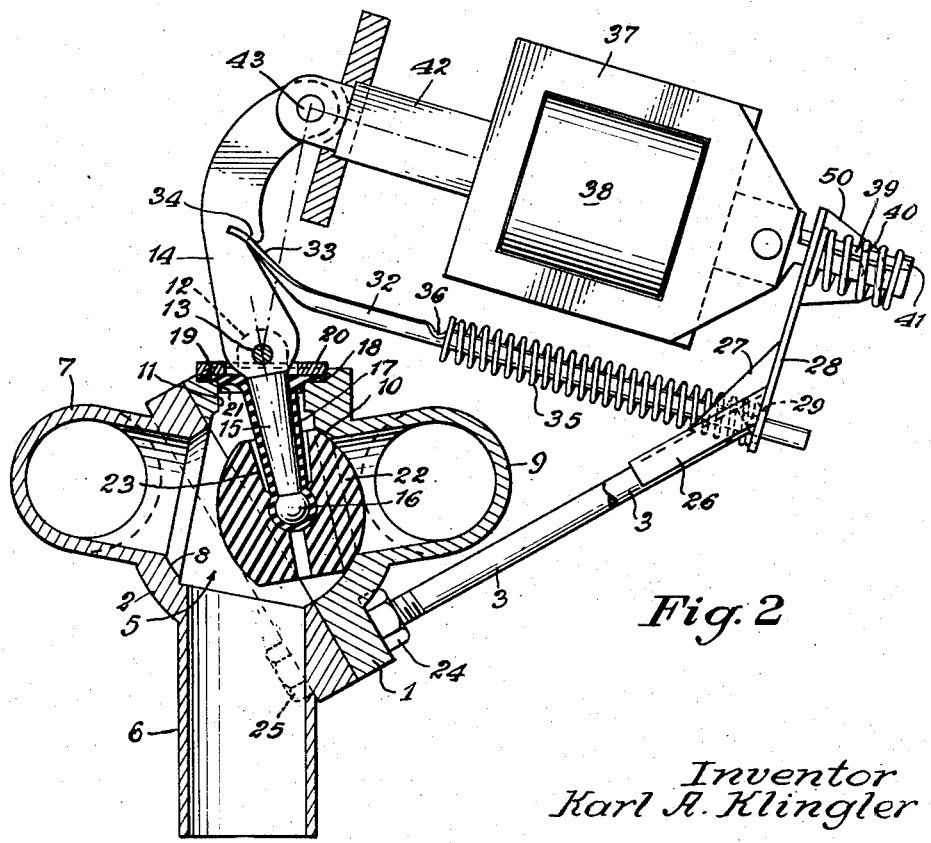
Figure 2 is a longitudinal section through Figure 1 showing the parts in the position assumed when the solenoid or motive element is idle.

In the position shown in Figure 2 with the solenoid not energized, the line of pull along the axis of the solenoid plunger is generally perpendicular to the effective lever arm between pivot points 13 and 43 so that at the beginning of solenoid operation when the plunger is furtherest out and so its effect is at the minimum, the leverage is applied through a ninety degree angle. As the plunger goes further toward seating, the angle becomes more obtuse so that the advantage of the leverage decreases as the plunger approaches the point of maximum pull.

At the same time as the lever 14 rotates in a clockwise direction, the resistance of the compression spring 35 increases and the further lever 14 rotates the greater the resistance of the spring 35 until the valve ball 22 seats against the seat 8 and can go no further. This amounts to a stop limiting the angular travel of the lever 14. Thereafter since the plunger has not yet seated and needs to seat to complete its cycle, the springs 40 are now compressed and the solenoid 38 moves toward the pivot point 43. This is possible because the strength of the springs 40 is greater than the strength of the spring 35 and until the solenoid has urged the lever 14 as far as it can go, compressing the spring 35, the springs 40 remain in position and the movement of the solenoid against their compression only takes place after the valve has seated in the new position and rotation of the lever 14 has been brought to a stop.

During this part of the operation because of the previous angular displacement in a clockwise direction of the lever 14, the relationship between the effective lever centering at 13 in opposition to the push rod 32 has now changed so that there is an obtuse angle between that lever and the line of force of the spring 36 so as to reduce the power of that spring in opposition to the power of the solenoid.

An ear 50 extends from the abutment plate 28, is apertured at 51 and is generally in line with one side of the valve housing.

The use and operation of my invention are as follows:

The valve housing itself is a two-part casting. It might be plastic, white metal or anything else. There is a valve seat in each part, the valve seats being in opposition to one another, the planes of the valve seats being slightly inclined toward the pivot point of the valve closing lever so that the lever in either position is substantially at right angles to the axis of the valve seat in order to insure proper valve seating.

One of the valve housing castings contains the inlet port and an outlet port. The other contains the opposed outlet port and is apertured to permit the valve actuating lever to penetrate the housing, there being pivot ears on either side of the aperture to support a pivot pin for the valve actuating lever. The lever has a finger penetrating the valve housing which carries a flanged sleeve which in turn penetrates and supports the valve ball. The valve on the sleeve is pressed against its seat by a washer which in turn is held in the sealing position by the pivot pin for the valve actuating lever.

The two valve housing parts with the valve between them are held together by four screws. Two of the screws are only to hold the housings together, the other two screws extend laterally also to support an abutment plate for the valve actuating solenoid.

The solenoid is slidably supported by the abutment plate, there being one or more guide pins rigidly mounted on the solenoid frame extending longitudinally therefrom through perforations in the plate. Each of these pins is encircled by a spring which abuts the under side of the plate. The pins take the form of stamped V-shaped or angle members with the ends partially cut and outwardly bent to engage the ends of the spring, thus obviating the necessary of cotter pins and holes. Two pins are better than one because they align and position the solenoid frame.

The solenoid plunger reciprocating with respect to the solenoid coil and the solenoid frame is pivoted to the outer end of the valve actuating lever. The plunger is adapted to abut against and be stopped by the solenoid frame when the plunger is drawn in.

The inward movement of the solenoid plunger is yieldingly resisted by a push rod which is formed by stamping from a thin plate, being stamped to a V-cross section where it passes through another hole in the abutment plate. The opposite end of the push rod is flattened and forked to engage a notch on the under side of the valve actuating lever, the two tines of the fork straddling the lever to hold it in place, the notch being located between the fulcrum of the lever and the pivot connection between lever and solenoid plunger.

A spring encircling the push rod abuts at one end on the abutment plate and at the other end on a collar stamped out of the push rod. The result of this arrangement is that no holes or cotter pins are used in connection with the push rod and the solenoid frame support. This results in easy assembly because a minimum of parts are brought together for assembly. It also results in substantial saving because holes are not bored, thus the valve housing and control mechanism are simple and inexpensive.

The mechanism itself is adapted to be mounted on a suitable support, for example—a washing machine frame. The washing machine frame is not illustrated. When the mechanism is to be assembled with a suitable support, the operated ear on the abutment plate is held against and may be bolted to the support. The valve housing being in the same plane as the ear engages the support and may be held against the support by any suitable clamp, or if desired, holes may be drilled in the wall of the housing to be engaged by the holding screws. This gives a two or three point support for the entire valve assembly which is entirely satisfactory in view of the fact that all the load of opening and closing the valve is concentrated in the valve assembly and is not transferred to the support for the valve assembly.

The spring or springs supporting and positioning the solenoid frame are substantially stronger than the spring associated with the push rod so whenever the solenoid is energized, the push rod spring is first overcome, the valve actuating lever is rotated until the ball valve seats. Then further pull of the solenoid overcomes the tension of the solenoid frame supporting spring or springs to insure that the solenoid will be able to seat independent of slight misalignment or slight inaccuracies in the relationship between the valve and the seat and this is true even though foreign matter may be caught between the valve seat and the valve and prevent final seating of the valve. Thus the solenoid which must always come home to avoid damage is able to seat no matter what happens to the valve.

In devices such as this, it is of the utmost importance to have the smallest possible solenoid to cut the price down and also it is of the utmost importance to have a solenoid which will work on excessively low voltages because of the characteristic of usual household wiring and household appliance power loads. The solenoid is at its weakest when the plunger starts to move down. The arrangement is such that the effective lever arm from the fulcrum of the lever to the point where it is pivoted on the solenoid plunger is at substantially right angles to the line of movement of the plunger, thus the solenoid is when at its weakest position getting the best mechanical advantage.

The sole purpose of the push rod and its spring is to return the valve and valve lever to the starting position after the solenoid is no longer applying its force. The biggest unseating load is at the time the valve is unseated and the arrangement is such that the line of pressure through which the force of the push rod spring is exerted is substantially at right angles to the effective axis of the lever arm at the time when the valve is to be unseated. At the other end of the valve excursion, the advantage of the push rod against the lever arm is reduced just as it should be so as to furnish a minimum opposition to movement of the solenoid when the solenoid starts from its initial weakest position.

The abutment plate is supported on the valve housing by two studs. The threads are rolled on the ends to equal length. Then a nut is screwed home on each of the threads, and is welded. This creates a positive adequate shoulder or abutment so that the other end on the thread may be drawn tight to close the two valve housing sections. The other end of each of these studs is welded to a stamping U-shaped in cross section to engage the stud adjacent its end and is flattened out in a spoon bill arrangement which rests against and can be welded to and give adequate strength and support to the abutment plate.

The dash dot lines in Figure 2 show the effective lever arm between points 13 and 43, show the line of pull of the solenoid at 43 and the line of pressure of spring 35 and push rod 32 to illustrate the angular relationship between these lines when the solenoid is in the inactive position. The dot and dash lines in Figure 3 show the same thing when the solenoid is energized and the lever 14 is in the opposite position.

I claim:

1. In combination, a solenoid yoke, a fixed apertured abutment plate, a guide member projecting from the yoke through the aperture, a solenoid plunger movable along a line parallel with the guide member, a push rod extending through the plate, a lever pivoted at one end on the plunger engaged intermediate its ends by the push rod, stop means adapted to limit the angular movement of the plunger between two extremes, spring means urging the yoke in a direction away from the lever and spring means urging the push rod in a direction toward the lever.

2. In combination, a solenoid yoke, a fixed apertured abutment plate, a guide member projecting from the yoke through the aperture, a solenoid plunger movable along a line parallel with the guide member, a push rod extending through the plate, a lever pivoted at one end on the plunger engaged intermediate its ends by the push rod, stop means adapted to limit the angular movement of the plunger between two extremes, spring means urging the yoke in a direction away from the lever and spring means urging the push rod in a direction toward the lever, the spring means associated with the guide means being more powerful than the spring means associated with the push rod.

3. In combination, a solenoid yoke, a fixed apertured abutment plate, a guide member projecting from the yoke through the aperture, a solenoid plunger movable along a line parallel with the guide member, a push rod extending through the plate, a lever pivoted at one end on the plunger engaged intermediate its ends by the push rod, stop means adapted to limit the angular movement of the plunger between two extremes, spring means urging the yoke in a direction away from the lever and spring means urging the push rod in a direction toward the lever, the line of force exerted on the lever by the plunger being at right angles to the effective lever arm of the lever and the line of force exerted by the push rod making an obtuse angle with the effective lever arm when the plunger is in the extended position.

4. In combination, a solenoid yoke, a fixed apertured abutment plate, a guide member projecting from the yoke through the aperture, a solenoid plunger movable along a line parallel with the guide member, a push rod extending through the plate, a lever pivoted at one end on the plunger engaged intermediate its ends by the push rod, stop means adapted to limit the angular movement of the plunger between two extremes, spring means urging the yoke in a direction away from the lever and spring means urging the push rod in a direction toward the lever, the line of force exerted on the lever by the plunger being at right angles to the effective lever arm of the lever and the line of force exerted by the push rod making an obtuse angle with the effective lever arm when the plunger is in the extended position, the line of force of the push rod being perpendicular to the effective lever arm and the line of force of the solenoid making an obtuse angle with the lever arm when the solenoid is in the retracted position.

5. In combination, a power element adapted to apply force along a straight line, through a limited excursion, the force increasing from one to the other end of its excursion, a lever, a driving connection between it and the power element, stop means limiting the angular excursion of the lever, yielding means adapted to apply force to the lever along a line generally parallel with the line of force of the power means, the force applied by the power means at the weaker end of its excursion being along a line generally perpendicular to the effective lever arm and at the stronger end of its excursion being along a line making an obtuse angle with the effective lever arm.

6. In combination, a power element adapted to apply force along a straight line, through a limited excursion, the force increasing from one to the other end of its excursion, a lever, a driving connection between it and the power element, stop means limiting the angular excursion of the lever, yielding means adapted to apply force to the lever along a line generally parallel with the line of force of the power means, the yielding means being adapted to apply force to the lever in opposition to the power means along a line making an obtuse angle with the effective lever arm while the power means is at the weaker end of its excursion and to apply its force to the lever along a line generally at right angles to the effective lever arm when the power means is at its maximum force.

7. In combination, a power element adapted to apply force along a straight line, through a limited excursion, the force increasing from one to the other end of its excursion, a lever, a driving connection between it and the power element, stop means limiting the angular excursion of the lever, yielding means adapted to apply force to the lever along a line generally parallel with the line of force of the power means, the force applied by the power means at the weaker end of its excursion being along a line generally perpendicular to the effective lever arm and at the stronger end of its excursion being along a line making an obtuse angle with the effective lever arm, the yielding means being adapted to apply force to the lever in opposition to the power means along a line making an obtuse angle with the effective lever arm while the power means is at the weaker end of its excursion and to apply its force to the lever along a line generally at right angles to the effective lever arm when the power means is at its maximum force.

References Cited in the file of this patent

UNITED STATES PATENTS

| | | |
|---|---|---|
| 1,557,580 | Gover | Oct. 20, 1925 |
| 2,035,747 | Harris | Mar. 31, 1936 |
| 2,368,120 | Downey | Jan. 30, 1945 |
| 2,383,693 | Starr | Aug. 28, 1945 |
| 2,694,414 | Seyferth | Nov. 16, 1954 |